Oct. 23, 1928.
M. S. SYKES
PICTURE HOOK AND WIRE ADJUSTER
Filed Sept. 24, 1926
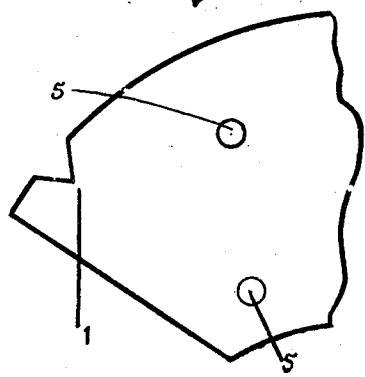
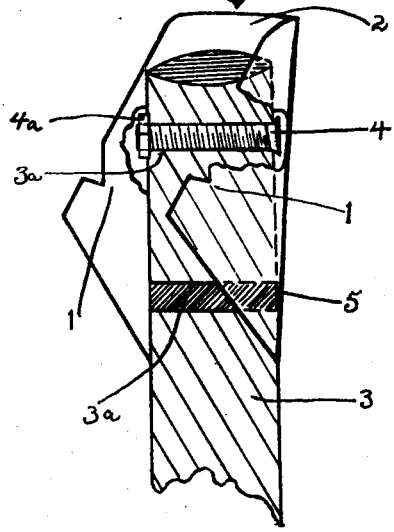
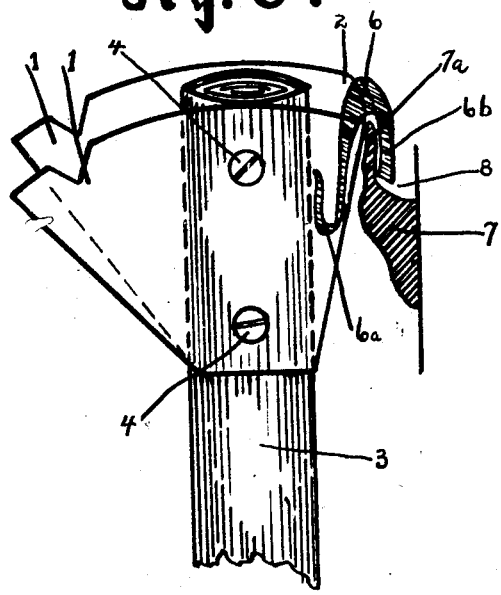
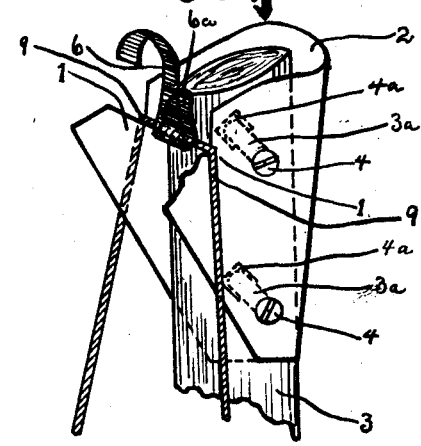
Malscott Sykes
INVENTOR Patented Oct. 23, 1928.

1,688,562

UNITED STATES PATENT OFFICE.

MAL SCOTT SYKES, OF JACKSON, MISSISSIPPI.

PICTURE HOOK AND WIRE ADJUSTER.

Application filed September 24, 1926. Serial No. 137,443.

This invention relates to picture hanging apparatus, and refers to a pole with a non-adjustable appurtenance of a cup and fingers attached at the extremity of the pole, for the handling of the hook and wire from the picture, whereby the hook may be attached or detached from the wall moulding, and likewise, the wire supporting the picture, on to and from the hook.

An object of the invention is to provide a device of the character described, capable of being operated at will without adjustment.

Another object is to provide a device of the character described, which by simple turning, may be used for attachment or detachment of a picture hook from the wall moulding; and, if desired, the wire supporting the picture, from the hook or to resting it thereon.

Another object is the provision of a pole which at its latter extremity has the appearance of a cup and extending horizontal fingers, by which, without adjustment of the mechanism, picture hooks, wire and pictures in attachment may be handled as desired.

Other objects and features will be set forth in the following description, taken in connection with the drawings attached hereto, as follows:

Figure 1 represents a cross-section of the pole with parts of the wings and cup broken away to show the manner of construction.

Figure 2 shows a portion of one wing, broken away at the angle of the cup lip.

Figure 3 shows a view of the invention, with portions in cross-section, and with one wing and side of the cup transparent, disclosing the manner of adjustment of the hook in conjunction with the wall moulding.

Figure 4 shows the invention, with portions broken away, in conjunction with the picture wire held in its fingers, and the hook in cross-section; disclosing the manner of adjustment of the wire, by the apparatus from and to the finger of the hook.

The lower portion of the hole, being the handle extended, is shown by the drawings broken off, the length of the pole being regulated only by the wish of the user and the height desired to be reached.

Following Figures 1, 2, 3 and 4, the fingers 1—1 are extenuations of the wings to the cup 2, which is formed at the further extremity of the fingers 1—1, by the pole 3, which is fastened between the wings by bolts 4—4, which pass thru the apertures 5—5 in the wings and the holes 3ª—3ª in the pole head 3, the bolts 4—4 being fastened to the pole head 3 by nuts 4ª—4ª in the customary manner, thus establishing fixity of fingers 1—1 and cup 2 at the pole extremity.

The structure of the fingers 1—1 and cup 2 is of some rigid material for the necessary strength in the handling of the mechanism.

Following Figure 3, the hook 6 rests on moulding 7, when the lip of the cup 2 passes under the hook 6 and is raised, the hook 6 is also raised from its rest on moulding 7 and now rests on the lip of the cup 2; thus removing the hook 6 from the moulding 7. For attachment of hook 6 to moulding 7, the hook 6 is placed, with the finger 6ª, toward the pole 3, and within the cup 2, the upper oval of said hook 6 resting on the lip of the cup 2, allowing the extension of the hook 6ᵇ to hang free of the cup 2. Held thus by the cup 2, the hook 6 is raised, until the hook extension 6ᵇ is above and over the lip 7ª of the moulding 7. As the handle 3 is lowered, the extension 6ᵇ, of the hook 6, falls to rest in the groove 8, formed by the moulding 7 with the wall to which affixed. The hook 6 is thus released of the cup 2 and attached to the moulding 7.

Following Figure 4: from groove to groove in fingers 1—1 passes the wire 9, which extends downward on either outer side of fingers 1—1, to the lower extremities of which wire 9 is attached a picture, not shown in the drawing. As the pole 3 is lowered or raised, so the picture attached to the extremities of the wire is lowered or raised. The wire 9 is shown resting in the lower lip 6ª of the hook 6. On raising of the pole 3, the fingers 1—1 pass on either side of the hook 6, taking the wire 9 in the grasp of the extended fingers 1—1; as the pole 3 is lifted further the wire 9 is raised from its rest in the lip 6ª and free of the support accorded by it, being now supported wholly by the fingers 1—1. To rest the wire 9 within the lip 6ª of the hook 6 the pole 3 is lowered until the wire 9 is just above and in juxtaposition to the hook 6.

Lowering the pole 3, the wire 9 comes to rest on the lip 6ª, at which instant the fingers 1—1 release their hold of said wire 9, the weight being assumed by the hook 6.

It will thus be seen, in this manner pictures and hooks may be attached and hung or removed at will, with a minimum of effort and manipulation; and that the invention is practical, easily usable and highly durable.

What is claimed is:

In a device of the class described, a pole, a combined picture hook and picture wire engaging element of U-shape formation at one end of the pole, said engaging element being secured to the pole intermediate the ends of the parallel arms of the U thereby forming a cup adjacent one side of the pole adapted to engage a picture hook and on the other side of the pole a notch in the upper edge of each of the arms adjacent the open end of the U, said notches adapted to engage the picture wire.

MAL SCOTT SYKES.